(12) United States Patent  (10) Patent No.: US 6,959,894 B2
Hayashi  (45) Date of Patent: Nov. 1, 2005

(54) IMPACT RESISTANT STRUCTURE FOR THE HELICOPTER AND ENERGY ABSORBER USED FOR THE SAME

(75) Inventor: Tohru Hayashi, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/724,186

(22) Filed: Dec. 1, 2003

(65) Prior Publication Data

US 2005/0001093 A1   Jan. 6, 2005

(30) Foreign Application Priority Data

Dec. 4, 2002  (JP) .............................. 2002-353075

(51) Int. Cl.$^7$ ................................................ B64C 1/06
(52) U.S. Cl. ............................. 244/17.11; 244/117 R; 188/377; 267/140
(58) Field of Search ......................... 244/17.11, 117 R, 244/119, 17.27; 188/376–377; 293/110, 120; 267/140; 428/119; 256/13.1

(56) References Cited

U.S. PATENT DOCUMENTS

| | | | |
|---|---|---|---|
| 3,552,525 A * | 1/1971 | Schudel ..................... | 188/377 |
| 3,664,463 A | 5/1972 | Kuethe | |
| 3,682,463 A * | 8/1972 | Radimirsch et al. ........ | 188/377 |
| 3,997,133 A | 12/1976 | Fagan | |
| 4,029,350 A * | 6/1977 | Goupy et al. ............... | 293/110 |
| 4,077,495 A * | 3/1978 | Chase ......................... | 188/376 |
| 4,084,029 A * | 4/1978 | Johnson et al. ............. | 428/119 |
| 4,227,593 A * | 10/1980 | Bricmont et al. ........... | 188/377 |
| 4,336,868 A | 6/1982 | Wilson et al. | |
| 4,352,484 A * | 10/1982 | Gertz et al. ................ | 256/13.1 |
| 4,531,695 A | 7/1985 | Swinfield | |
| 4,593,870 A | 6/1986 | Cronkhite et al. | |
| 5,024,399 A | 6/1991 | Barquet et al. | |
| 5,069,318 A | 12/1991 | Kulesha et al. | |
| 5,366,181 A | 11/1994 | Hansen | |
| 5,451,015 A * | 9/1995 | Cronkhite et al. ........ | 244/135 R |
| 5,542,626 A | 8/1996 | Beuck et al. | |
| 5,547,148 A | 8/1996 | Del Monte et al. | |
| 5,746,419 A * | 5/1998 | McFadden et al. ......... | 267/140 |
| 5,746,537 A | 5/1998 | Kellas et al. | |
| 6,427,945 B1 | 8/2002 | Bansemir | |
| 6,472,043 B1 | 10/2002 | Kobayashi et al. | |
| 2002/0043809 A1 | 4/2002 | Visama | |

FOREIGN PATENT DOCUMENTS

DE        44 25 829 C1   10/1995

(Continued)

OTHER PUBLICATIONS

Richard L. Boitnott et al., "Full-Scale Crash Test of the Sikorsky Advanced Composite Airframe Program Helicopter" US Army Research Laboratory, Vehicle Technology Directorate, MRJ Technology Solutions, Fairfax, VA.

*Primary Examiner*—Galen Barefoot
(74) *Attorney, Agent, or Firm*—Oliff & Berridge, PLC

(57) ABSTRACT

An impact resistant structure of a helicopter having an energy absorber positioned under a floor of the helicopter and directly connected to a cabin frame of the helicopter. The energy absorber is arranged in accordance with a distribution of a ground reaction force on a general ground at a time of crash situation. The energy absorber also includes a plurality of independent hollow tubes of fiber reinforced composite material integrally formed by bundling only the hollow tubes. The hollow tubes are arranged so as to reduce a number of intersecting wall surfaces of the hollow tubes.

14 Claims, 17 Drawing Sheets

FOREIGN PATENT DOCUMENTS

| | | |
|---|---|---|
| EP | 0 497 142 A2 | 8/1992 |
| JP | A 2000-192432 | 7/2000 |
| JP | A 2001-153169 | 6/2001 |
| JP | A 2002-036413 | 2/2002 |
| JP | A 2002-286066 | 10/2002 |

* cited by examiner

IMPACT RESISTANT STRUCTURE FOR THE HELICOPTER AND ENERGY ABSORBER USED FOR THE SAME

BACKGROUND OF THE INVENTION

1. Field of the Invention

The present invention relates to an impact resistant structure for a helicopter and an energy absorber used for the same.

2. Description of the Related Art

A helicopter is often operated in visual flight rule, or between mountains, or at a low altitude, because of its operating characteristics. Then, there is always a risk of accident due to contact with an obstacle. Therefore, an impact resistance is strongly required in a helicopter in order to keep survivability of crew members in the crash situations.

The basic principle for the impact resistant structure of a helicopter is to adopt a continuous strong keel K for a nose H easily crushed and a bottom G easily crushed which are shown in FIG. 16(a) to prevent a floor D from structural failure on crash landing as shown in FIG. 16(b), to adopt a strong outer skin P as shown in FIG. 16(c), to adopt a strong beam B on the keel K, and to adopt a continuous strong frame F.

For a helicopter of which landing gear, such as retracted one, may not be effectively functioned for crash energy absorption, an impact resistant fuselage structure having impact absorption capacity is required for the typical crush environment shown in FIG. 17 in a shape fitting to the actual helicopter fuselage structure.

Conventionally, the floor structure of a helicopter is designed according to a normal operational flight load and a landing load on the ground. At present, general impact absorption to an unexpected crash impact like crushing shown in FIG. 17 is not taken into account.

Conventional impact resistant structures for the helicopter are disclosed in U.S. Pat. No. 4,593,870, U.S. Pat. No. 5,069,318, and U.S. Pat. No. 5,024,399. Meanwhile, in a helicopter, on the typical ground surface, as shown in FIG. 18, the ground reaction force is concentrated on the outer wall, though in the impact resistant structures disclosed in the above-mentioned U.S. patents, a floor member is not arranged so as to be suitable to ground reaction force. Further, as shown in FIG. 19 (Ref. "Full-Scale Crash Test of the Sikorsky Advanced Composite Airframe Program Helicopter" Richard L. Botinott, AHS 56$^{th}$), the web intersection part X is hard to be crushed, and the sub-floor effective stroke is not effectively utilized, so that a sufficient floor acceleration reduction is not realized. Furthermore, the effective function, under the condition in which the landing gear is not effectively functioned, against the combined crash speed environment of the horizontal speed and drop speed of the general crash environment of a helicopter shown in FIG. 17 is not disclosed in the U.S. patents.

Examples of impact resistance absorption members used in the impact resistant structure of a helicopter and the impact resistant structure for general industrial purpose are disclosed in Japanese Patent Laid-Open Publications No.2002-286066, No.2002-36413, No.2001-153169, No.2000-192432, and U.S. Pat. No. 5,746,537, such as an example using axial compression energy absorption of a light weight fiber reinforced composite material tube, and an example that a foaming material is filled up in all sections for energy absorption improvement.

However, to reduce an impact load by a long absorption stroke, and simultaneously, to realize high impact energy absorption of the merit of a fiber reinforced composite material tube without instability of overall general buckling, if the section of the single tube is simply made larger, the local buckling tendency of the tube wall will be increased and the stable progressive failure mode suitable for impact energy absorption of fiber reinforced composite tube shown in FIG. 20 cannot be achieved. Further, when a foaming material is filled in all the sections, a space for releasing destroyed small pieces of the composite material generated in the progressive failure mode is lost, and the destroyed small pieces are compacted, and the energy absorber will become extremely stiffened. Thereby, the effective stroke is reduced, and a required impact absorption capability is not obtained. Further, to reduce the local unstable buckling of the tube wall, when the section size of the tube is made compact, the aspect ratio (energy absorber height/section width) of whole the energy absorber becomes long and slim, and the energy absorber becomes weak for bending and eccentric compression, so a desired axial compression energy absorption property cannot be achieved. As a solution for these problems, when the section of the tube is made compact, and is made into a bundling shape, when the number of tubes is optionally adjusted, the number of intersections between stiff walls increases as the number of tubes increases, so that as shown in FIG. 21, the initial load peak level harmful for the impact absorption property increases.

SUMMARY OF THE INVENTION

Therefore, an object of the present invention is to provide an impact resistant structure of a helicopter, i.e., for a helicopter of which landing gear such as retracted one may not be effectively functioned in crash situation, to provide a fuselage structure having impact absorption capacity against the actual crash environment while providing in a shape fitting to the actual helicopter fuselage structure. Another object of the present invention is to provide a light weight energy high performance absorber in which the harmful initial load peak level is reduced, and in which the energy absorption property due to axial compression failure is improved, also which is able to apply not only to the impact resistant structure of a helicopter but also to the impact resistant structure for general industrial purpose, and which have a desired impact absorption capacity in a shape fitting to the actual helicopter fuselage structure, furthermore in which the effective stroke is increased.

According to one aspect of the present invention, an impact resistant structure of a helicopter comprises: an energy absorber positioned under a floor of the helicopter and directly connected to a frame of the helicopter, the energy absorber being arranged in accordance with a distribution of a ground reaction force on a general ground surface at a time of crash situation.

According to another aspect of the present invention, an impact resistant structure of a helicopter comprises: an energy absorber in bundled-tubes state directly connected to a frame of the helicopter at a position almost directly under the frame where an impact load is concentrated at a time of crash situation.

Preferably, the impact resistant structure of a helicopter further comprises a plurality of curved panels, which take a horizontal load due to a forward crash speed and are crushed in a pantograph shape by a vertical load at the time of crash situation, arranged almost in an longitudinal direction of the helicopter and connected to an under-floor outer skin or web of the helicopter.

Preferably, an impact resistant structure of a helicopter further comprises a truss frame connecting the curved panels almost in an X-shape so as to function as a frame member for holding the curved panels during a normal operational use and not to prevent the curved panels from deforming in the pantograph shape at the time of crash situation.

Preferably, in the impact resistant structure of a helicopter, a floor beam of the helicopter is arranged on the curved panels, the floor beam being connected to the frame to which the energy absorber is directly connected, thereby a frame-floor beam structure is formed.

Preferably, in the impact resistant structure of a helicopter, a cabin structure in a gate shape is positioned above the frame-floor beam structure, the cabin structure being connected to the frame-floor beam structures at both side ends of the frame.

According to another aspect of the present invention, an energy absorber comprises: a plurality of independent hollow tubes of fiber reinforced composite material integrally formed by bundling only the hollow tubes of fiber reinforced composite material, the hollow tubes of fiber reinforced composite material being arranged to reduce a number of intersections between walls of the hollow tubes.

According to another aspect of the present invention, an energy absorber comprises: a plurality of independent hollow tubes of fiber reinforced composite material bundled by an outer layer of fiber reinforced composite material, wherein the hollow tubes of fiber reinforced composite material and the outer layer of fiber reinforced composite material are arranged so as to reduce a number of intersections between walls of the hollow tubes or between the wall of the hollow tube and the outer layer.

Preferably, in the energy absorber, the hollow tubes of fiber reinforced composite material and the outer layer of fiber reinforced composite material are arranged such that a number of intersecting walls of the hollow tubes or the outer layer is less than four surfaces.

Preferably, in the energy absorber, the hollow tubes of fiber reinforced composite material and/or the outer layer of fiber reinforced composite material for bundling the hollow tubes are formed in a plurality of layers in a thickness direction, a film-shaped layer material having lower strength than that of a base material being inserted between end portions of the plurality of layers.

Preferably, in the energy absorber, the hollow tubes of fiber reinforced composite material and the outer layer of fiber reinforced composite material for bundling the hollow tubes are integrally formed.

Preferably, in the energy absorber, a foaming material is inserted into a properly selected space from between the hollow tubes of fiber reinforced composite material, between the hollow tubes of fiber reinforced composite material and the outer layer of fiber reinforced composite material, and insides of the hollow tubes of fiber reinforced composite material.

Preferably, in the energy absorber, the hollow tubes of fiber reinforced composite material are provided with a sectional space for storing destroyed small pieces sequentially generated by progressive crushing.

Preferably, in the energy absorber, a sectional shape of each of the hollow tubes of fiber reinforced composite material is circular, elliptic, square, triangular, hexagonal, or octagonal.

Preferably, in the energy absorber, the hollow tubes of fiber reinforced composite material are arranged in a row or in plural rows and are bundled circularly, elliptically, rectangularly, or squarely by the outer layer of fiber reinforced composite material.

Preferably, in the energy absorber, the hollow tubes of fiber reinforced composite material, the foaming material, and the outer layer of fiber reinforced composite material are integrally formed.

BRIEF DESCRIPTION OF THE DRAWINGS

The above and other objects, features and advantages of the present invention will become more apparent from the following description taken in connection with the accompanying drawings, in which:

The above and other objects, features and advantages of the present invention will become more apparent from the following description taken in connection with the accompanying drawings, in which:

FIG. 11 is a drawing showing the configuration of energy absorbers of the conventional example and the configuration of energy absorbers of Embodiments 1 and 2 for which the load-displacement characteristic test for measuring the initial load peak is to be carried out;

DESCRIPTION OF THE PREFERRED EMBODIMENTS

An impact resistant structure for the helicopter of an embodiment of the present invention and an energy absorber of an embodiment of the present invention used in the same will be explained below with reference to the accompanying drawings.

Figure 1:
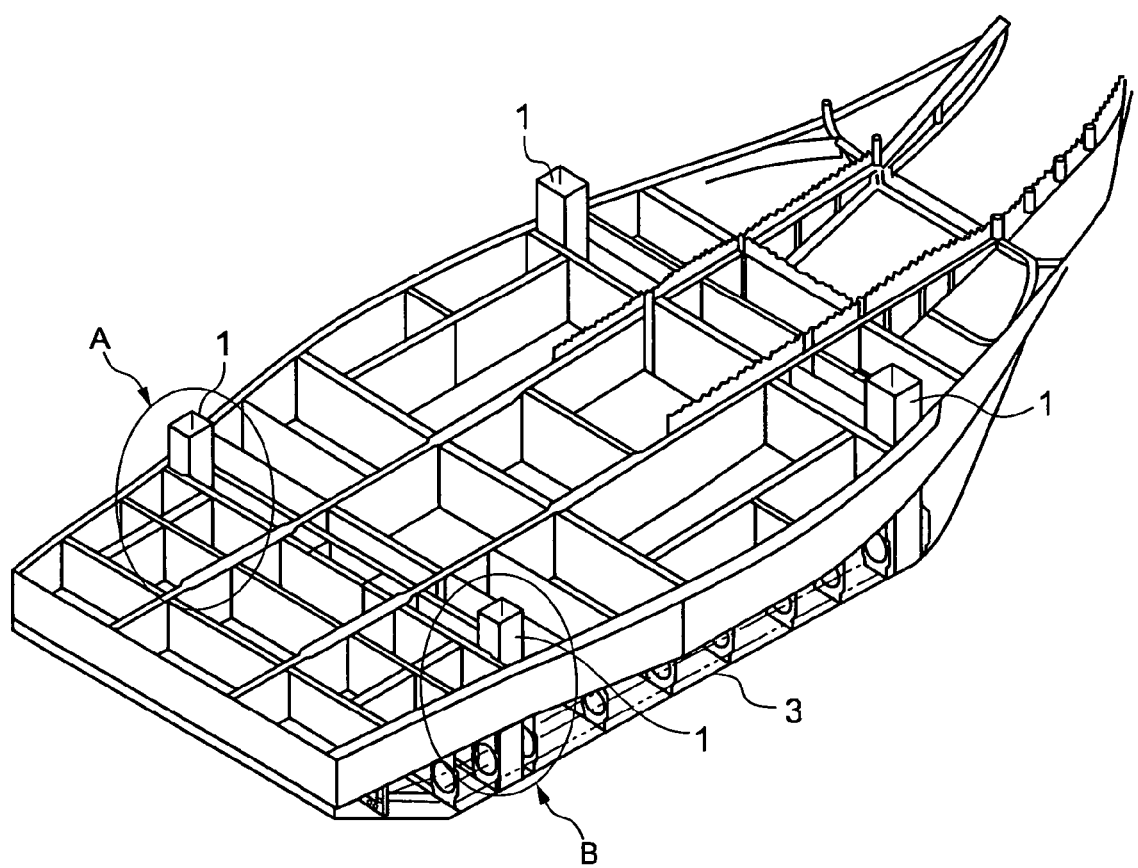
FIG. 1 is a schematic perspective view showing the bone structure of the sub-floor of a helicopter to which the impact resistant structure of an embodiment of the present invention is applied.

Firstly, the impact resistant structure of a helicopter will be explained by referring to FIGS. 1 to 3. The gray parts shown in FIG. 1 are energy absorbers 1 in bundled-tubes state. The energy absorbers 1 are arranged under the floor in accordance with the ground reaction force distribution at the time of crash situation on the general ground surface shown in FIG. 17 and are directly connected to a frame 2 as shown in FIGS. 2 and 3.

Figure 17:
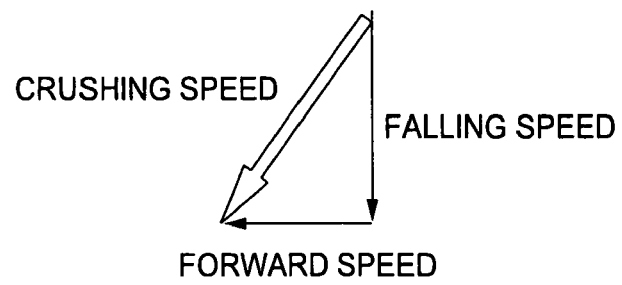
FIG. 17 is a drawing showing the general crush environment of a, helicopter.
Figure 18:
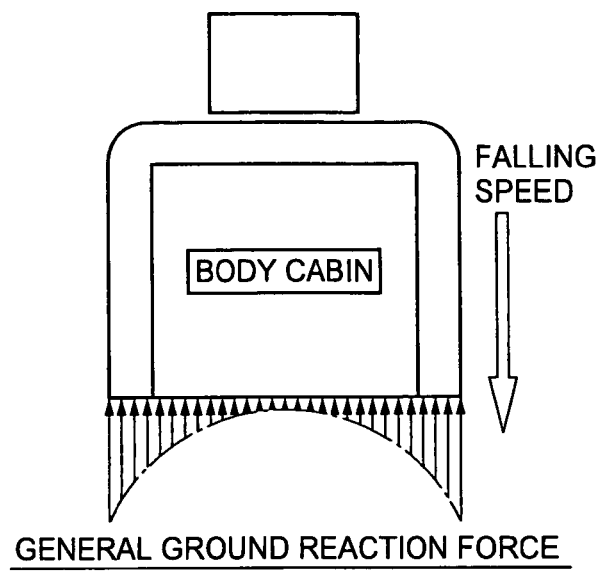
FIG. 18 is a drawing showing the state that the under-floor crush load on the general ground surface is concentrated on the outer wall.
Figure 19:
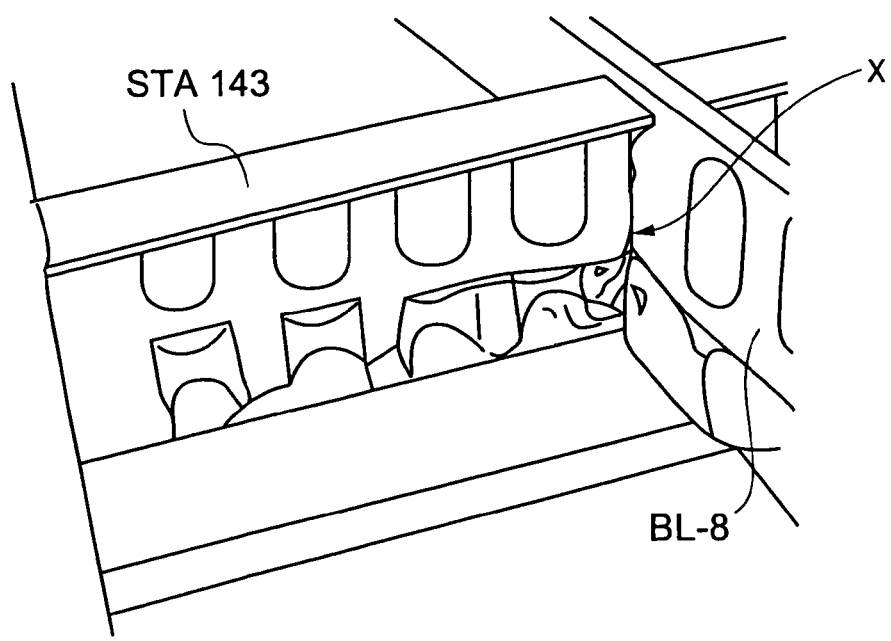
FIG. 19 is a perspective view showing the crushing state of the floor member of a conventional helicopter.
Figure 20:
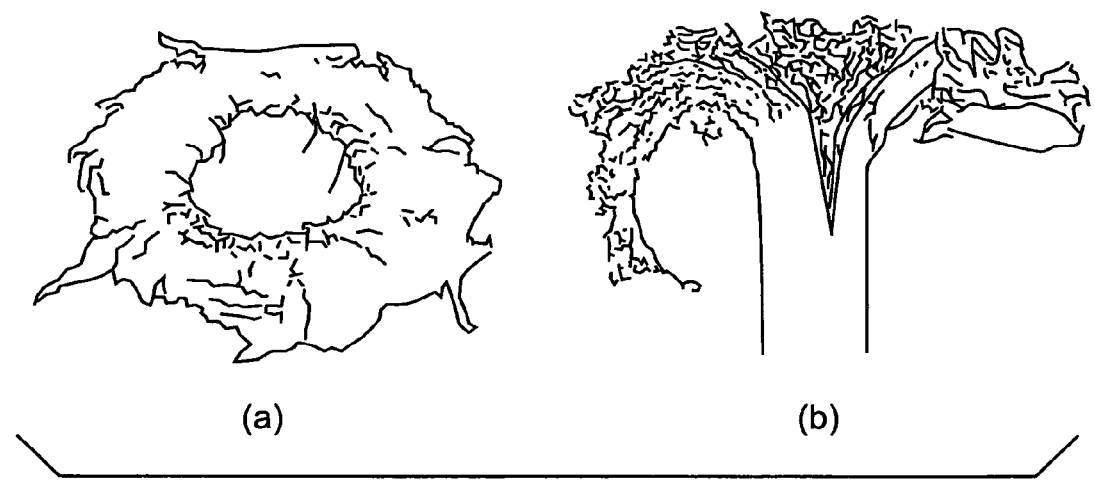
FIGS. 20(a) and 20(b) are drawings showing the preferable and stable sequential destruction mode for impact energy absorption intrinsic to tubes of composite material.
Figure 21:
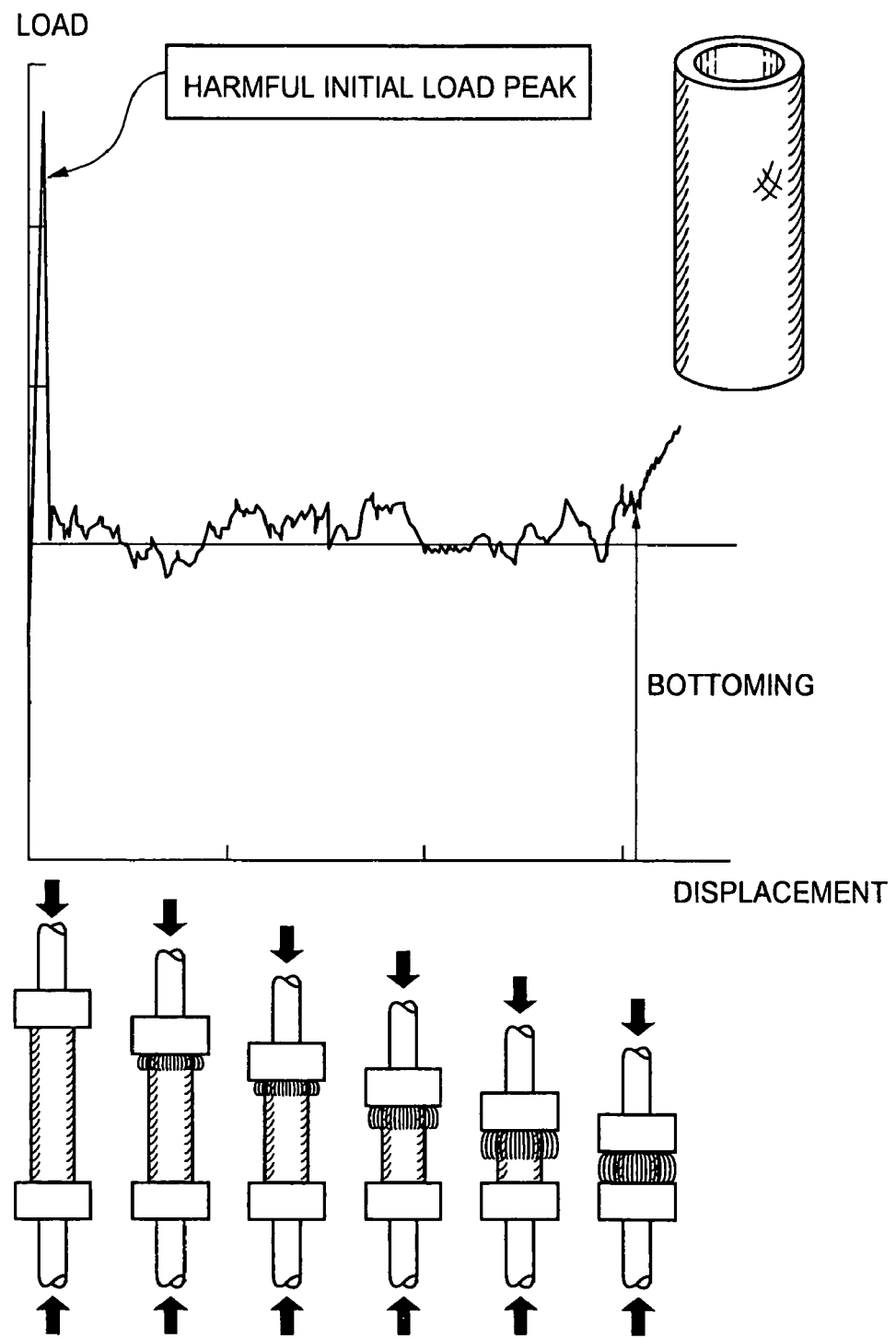
FIG. 21 is a drawing showing the general load-displacement characteristics of tubes of composite material at the time of crushing in the axial direction.

The energy absorbers 1 in the bundled-tubes state may be directly connected to the frame 2 almost directly under the side wall of the frame 2 where the impact load is concentrated at the time of crash situation shown in FIG. 17. In FIG. 1, numeral 3 indicates an under-floor outer skin or web and on the under-floor outer skin or web 3, many curved panels 4 are arranged integrally and in parallel with each other almost in the longitudinal direction of the helicopter. The curved panels 4 operate as a keel beam during the normal operational use as shown in FIGS. 2 and 3, receive the horizontal load due to the forward speed at the time of crash situation shown in FIG. 17, and are crushed in a pantograph shape by the vertical load.

Figure 2:
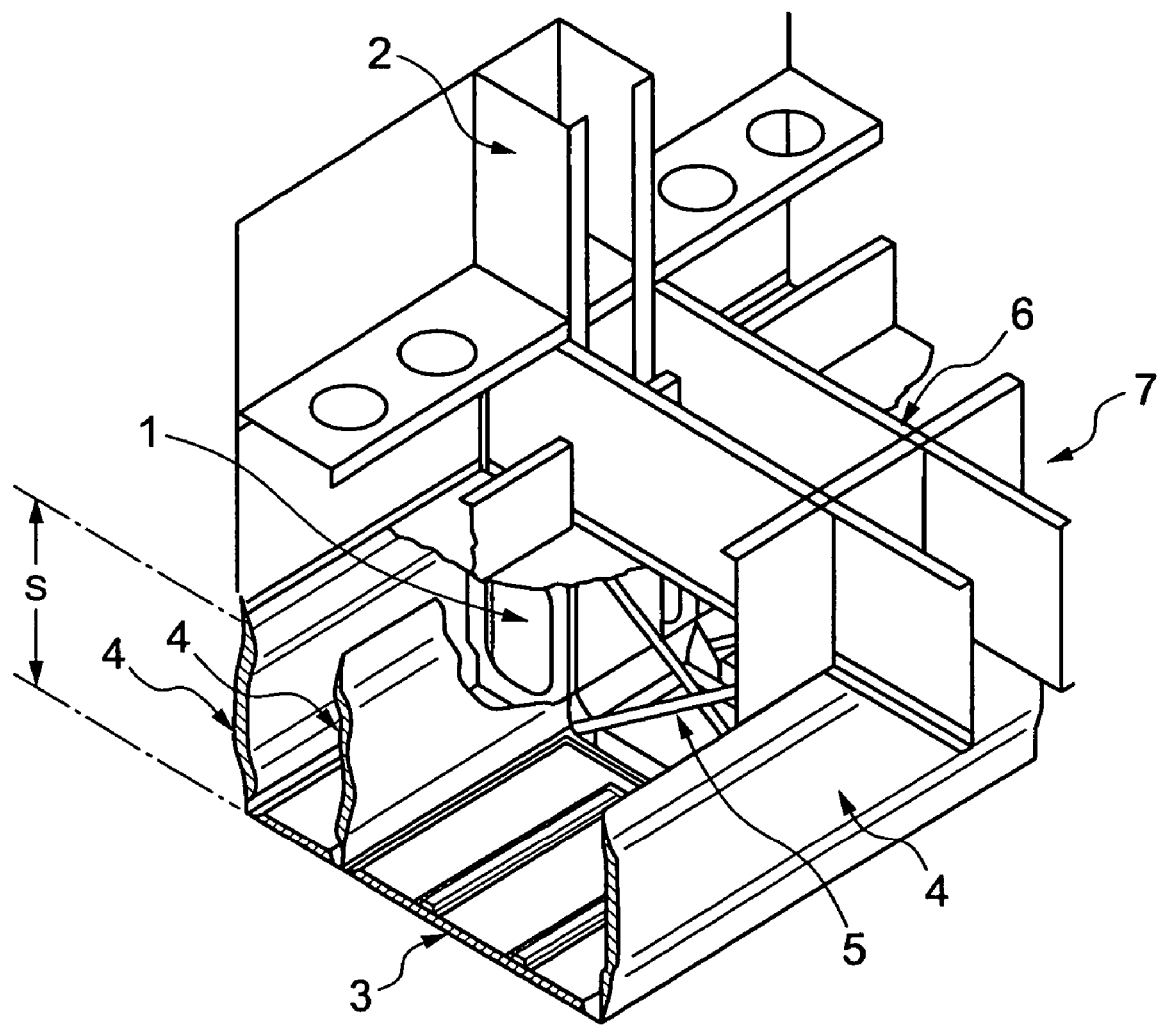
FIG. 2 is an enlarged perspective view of the section A shown in FIG. 1.
Figure 3:
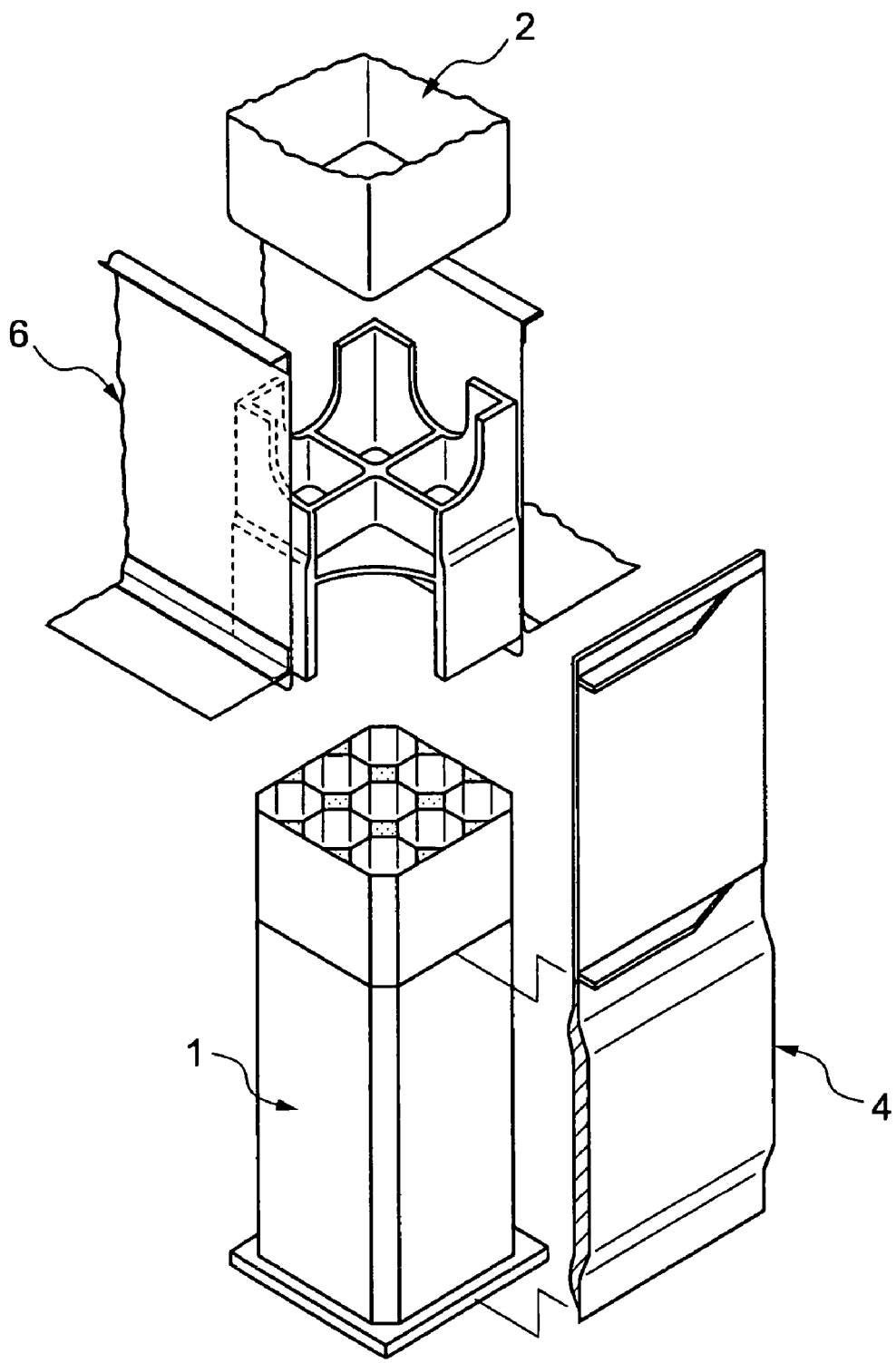
FIG. 3 is an enlarged perspective view of the section B shown in FIG. 1.

Between the curved panels 4, a truss frame 5 is installed in an almost X shape as shown in FIG. 2. The truss frame 5 holds the curved panels during the normal operational use. The truss frame 5 does not prevent the curved panels 4 from deformation at the time of crushing. A floor beam 6 is arranged on the curved panels 4. The floor beam 6 is connected to the frame 2, to which the energy absorbers 1 are directly connected, as shown in FIG. 2, thereby, a frame-floor beam structure 7 is formed.

In the impact resistant structure of a helicopter of the present embodiment which is configured as described above, the energy absorbers 1 in the bundled-tubes state are arranged under the floor in accordance with the ground reaction force distribution at the time of crash situation on the general ground surface and are directly connected to the frame 2. Thereby, even if the under-floor crush load is concentrated on the outer wall, the energy of crash is absorbed stably by the energy absorbers 1 in the bundled-tubes state which is excellent in energy absorption per unit weight.

Further, on the sub-floor outer skin or web 3, many curved panels 4 which operate as a keel beam during the normal operational use, receive the horizontal load due to the forward crash speed at the time of crash situation, and are crushed in a pantograph shape by the vertical load, and are arranged integrally and in parallel with each other almost in the longitudinal direction of the structure. Thereby, the under-floor stroke S is reserved and effectively used at the time of crash situation and the floor surface acceleration is sufficiently reduced.

Moreover, the truss frame 5 is installed between the curved panels 4, so that the truss frame 5, during the normal operational use, functions as a frame member for holding the curved panels 4, and at the time of crash situation, the curved panels 4 are surely crushed in a pantograph shape without preventing deformation, and the crash impact absorption capacity of sub-floor is improved.

Figure 4:
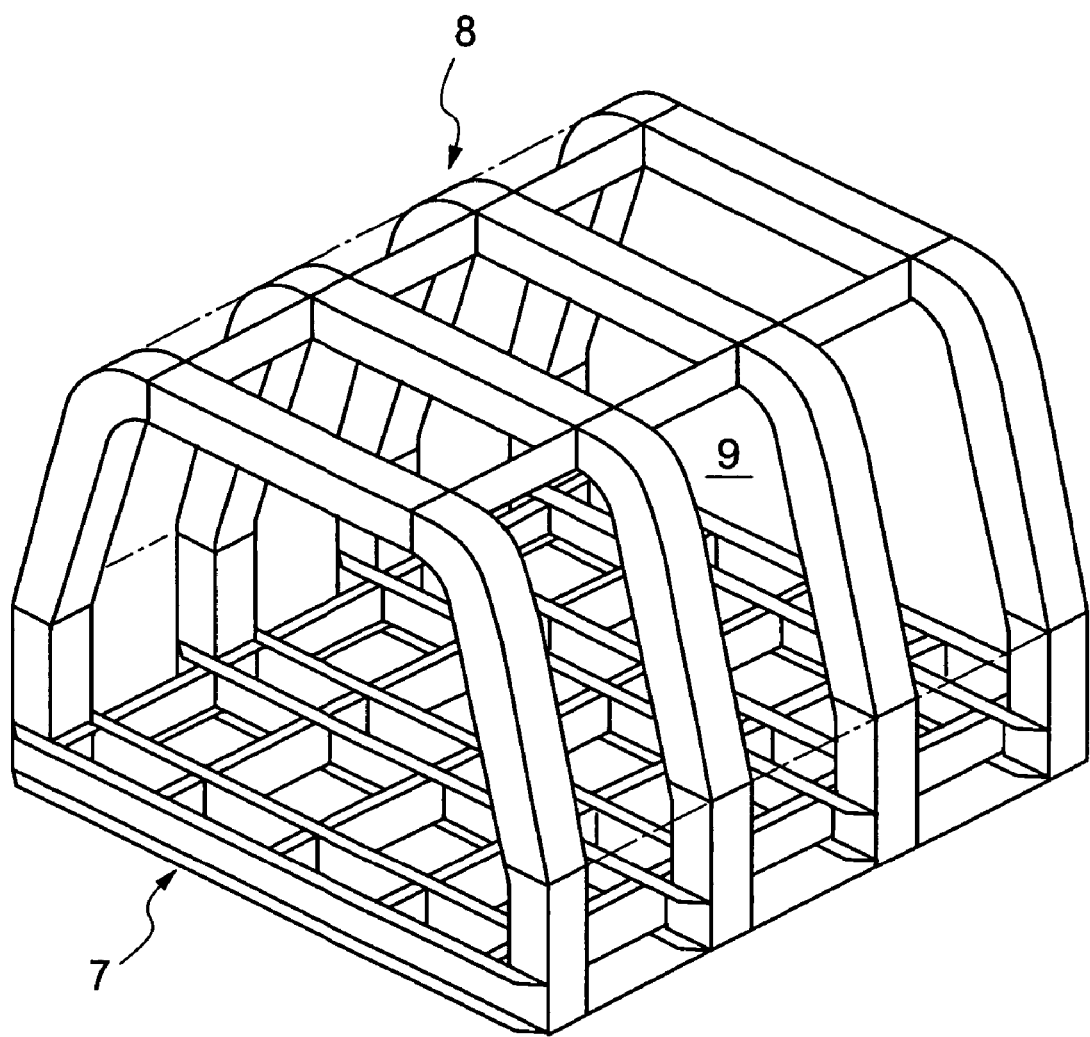
FIG. 4 is a perspective view showing an example of the gate-shape structure formed on the frame-floor beam structure of the impact resistant structure of the embodiment of the present invention.

Furthermore, since the floor beam 6 arranged on the curved panels 4 is connected to the frame 2 to which the energy absorbers 1 in the bundled-tubes state is directly connected so that the frame-floor beam structure 7 is formed, a gate-shape cabin structure 8 connected to the frame 2 at both side ends as shown in FIG. 4 can be formed above the frame-floor beam structure 7. During the normal operational use, the cabin structure 8 is supported by the frame-floor beam structure 7, and at the time of crash situation, the frame-floor beam structure 7 is prevented from destruction because the impact is absorbed by the energy absorbers 1 in the bundled-tubes state and the curved panels 4. Thereby, the cabin structure 8 is also prevented from destruction, and a crew member's survivable volume 9 inside the cabin structure 8 is maintained, and the survivability of crew members is improved. Moreover, the cabin structure 8 is a crew member's protective shell structure for preventing heavy equipments, e.g., a transmission, engine, etc., on the ceiling from falling or intrusion into the cabin at the time of crash situation and thereby the crew member's survivable volume is reserved.

Figure 5:
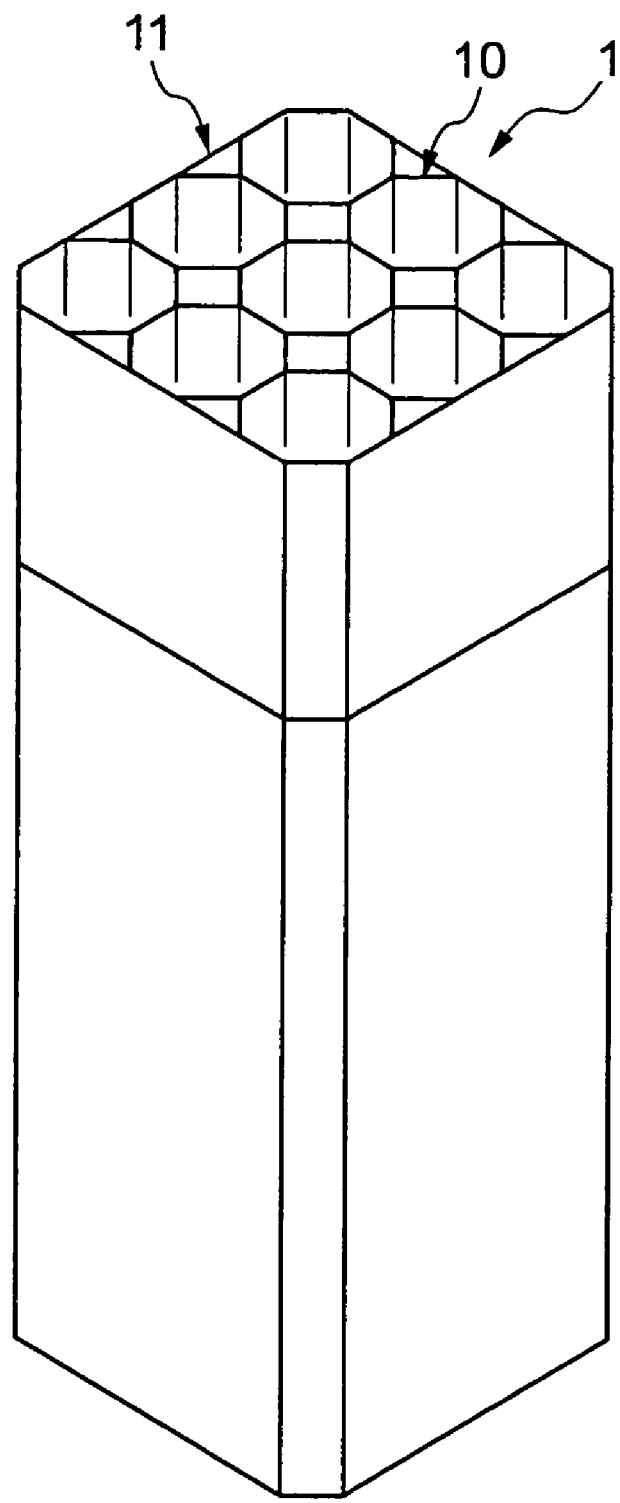
FIG. 5 is a perspective view showing one of the energy absorbers of the embodiment of the present invention.

Next, the energy absorbers 1 of the present embodiment used in the aforementioned impact resistant structure of a helicopter will be explained by referring to the drawings. Basically, with respect to the energy absorbers 1, it is desirable to bundle a plurality of hollow tubes of fiber reinforced composite material, reduce the number of intersecting walls of the hollow tubes of fiber reinforced composite material, and integrally form them. However, one unlimited example of the energy absorbers 1 is that as shown in FIG. 5, a plurality of independent hollow tubes of fiber reinforced composite material 10 having a small opening section are bundled by an outer layer made of fiber reinforced composite material 11, thus the walls of the hollow tubes of fiber reinforced composite material 10 which are light weight and excellent in energy absorption are stabilized from local buckling.

In the energy absorbers 1, when the number of intersections of the walls of the hollow tubes of fiber reinforced composite material 10 is reduced and the number of intersecting walls of the hollow tubes of fiber reinforced composite material 10 or outer layer made of fiber reinforced composite material 11 is reduced, the intersections are prevented from stiffening and the harmful initial load peak for crew member's survivability is suppressed.

Particularly, the hollow tubes of fiber reinforced composite material 10 and the outer layer made of fiber reinforced composite material 11 for bundling them are arranged such that a number of intersecting walls of the hollow tubes or outer layer is less than four surfaces. Thereby, the harmful initial load peak for crew member's survivability is suppressed more.

Figure 6:
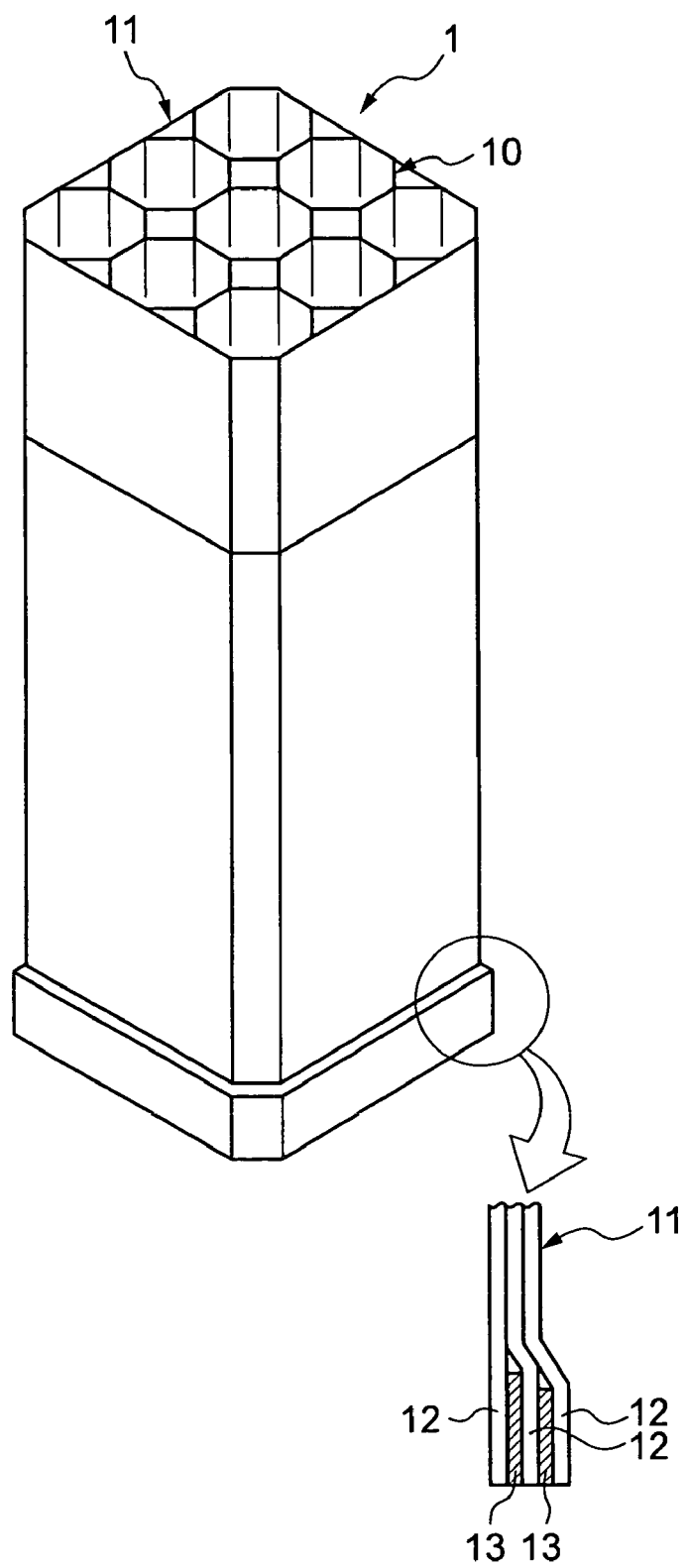
FIG. 6 is a perspective view showing a partially modified example of the energy absorber shown in FIG. 5.

Further, when the outer layer made of fiber reinforced composite material 11, as shown in FIG. 6, is formed in a plurality of layers in the thickness direction and between end portions 12 of the outer layer 11, a film-shaped layer material of low strength, for example, delamination films 13 are inserted, the harmful initial load peak for crew member's survivability is suppressed more. Further, in the energy absorbers 1, when the hollow tubes of fiber reinforced composite material 10 and the outer layer made of fiber reinforced composite material 11 for bundling them are integrally formed, energy of crush is preferably absorbed stably.

Figure 7:
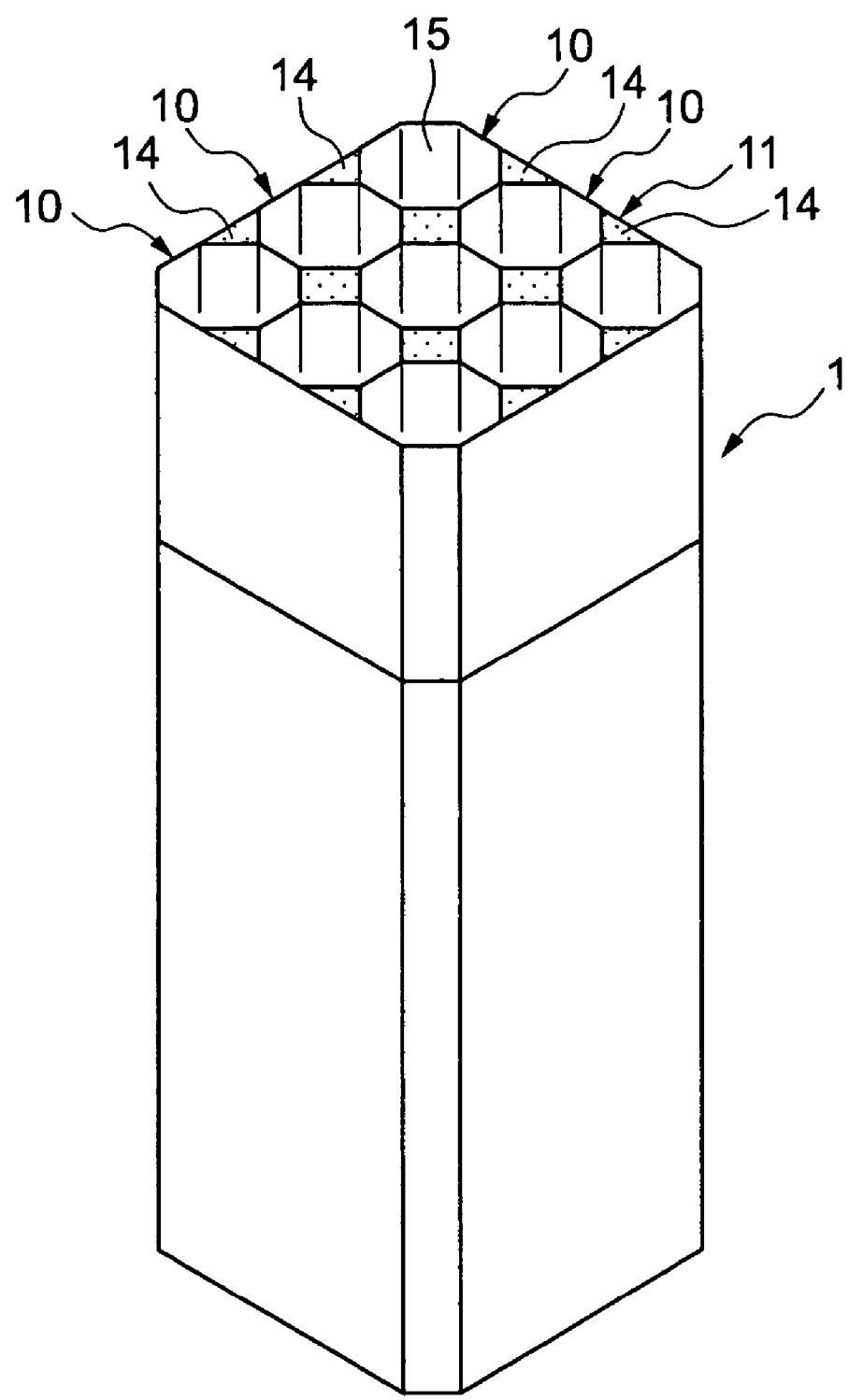
FIG. 7 is a perspective view showing another example of the energy absorbers of the embodiment of the present invention.

Another example of the energy absorber 1 of the present embodiment is that as shown in FIG. 7, in the space between the hollow tubes of fiber reinforced composite material 10 and in the space between the hollow tubes of fiber reinforced composite material 10 and the outer layer made of fiber reinforced composite material 11 for bundling the tubes, a foaming material 14 is inserted. Thereby, the walls of the hollow tubes of fiber reinforced composite material 10 are more stabilized from local buckling.

Further, the foaming material 14 is inserted not only into the space between the hollow tubes of fiber reinforced composite material 10 and into the space between the hollow tubes of fiber reinforced composite material 10 and the outer layer made of fiber reinforced composite material 11 but also properly selected insides of the hollow tubes of fiber reinforced composite material 10.

Further, the hollow tubes of fiber reinforced composite material 10 are provided with a sectional space 15 for storing destroyed small pieces sequentially generated by progressive crushing, so that whole energy absorber is prevented from stiffening due to compacting of the destroyed small pieces.

And, in the energy absorbers 1 shown in FIG. 7, when the hollow tubes of fiber reinforced composite material 10, the foaming material 14, and the outer layer made of fiber reinforced composite material 11 for bundling the tubes are integrally formed, the strength for bending and eccentric compression can be obtained and energy of crash can be absorbed stably.

Figure 8:
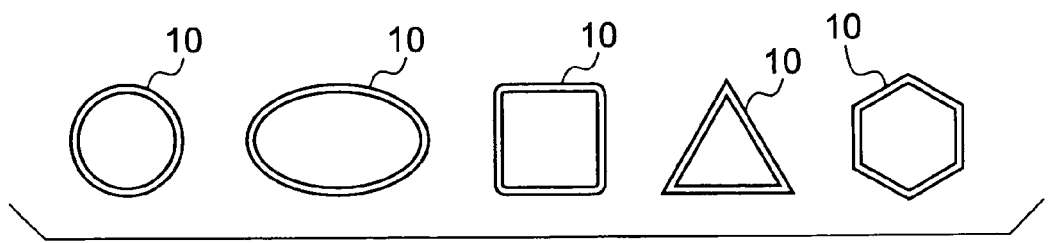
FIG. 8 is a drawing showing other examples of the sectional shapes of the hollow tubes of fiber reinforced composite material of the energy absorbers of the embodiment of the present invention.
Figure 9:
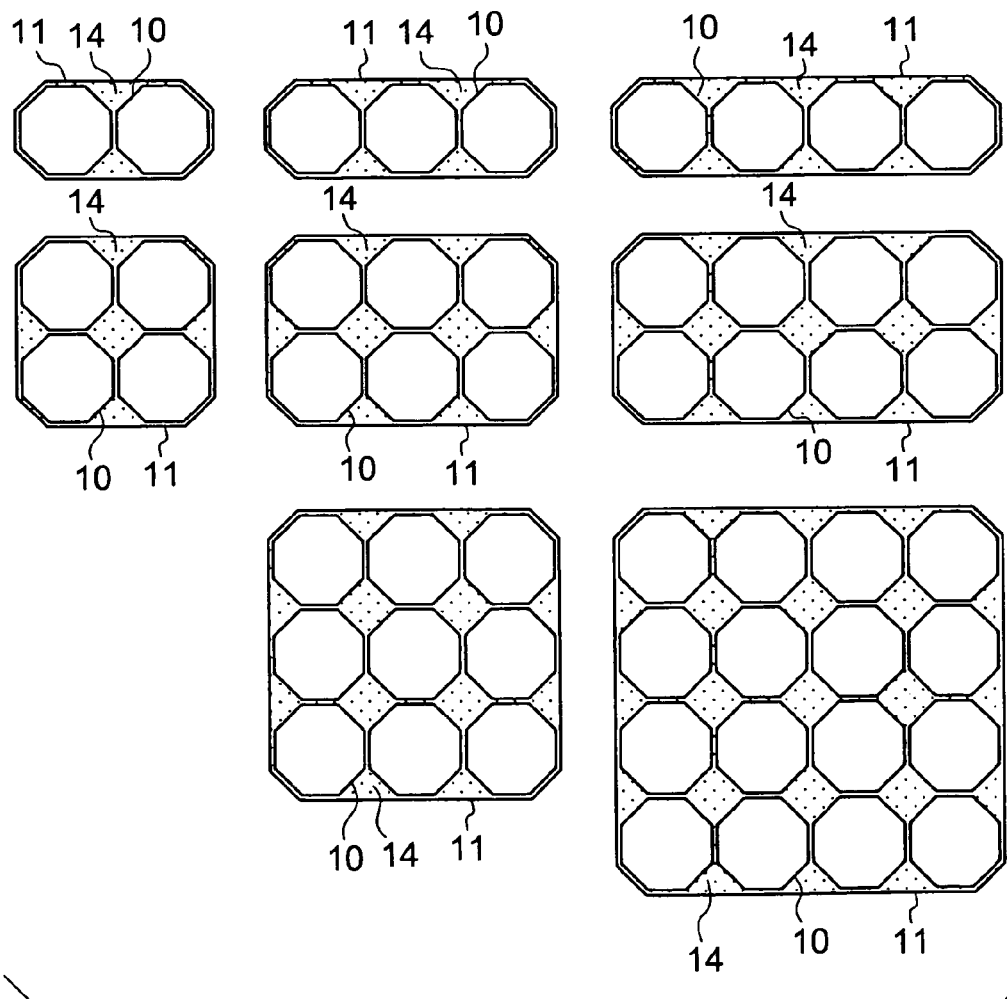
FIG. 9 is a drawing showing examples of bundling arrangement of the hollow tubes of fiber reinforced composite material each having an octagonal section.

In the energy absorbers 1 of the present embodiment, the sectional shape of each of the hollow tubes of fiber reinforced composite material 10 shown in the drawing is octagonal. However, as shown in FIG. 8, it may be circular, elliptic, square, triangular, or hexagonal. Further, as shown in FIG. 9, the hollow tubes of fiber reinforced composite material 10 having, for example, an octagonal section, may be arranged in a row, two rows, or three rows and bundled by the outer layer made of fiber reinforced composite material 11 rectangularly, squarely, circularly, or elliptically.

Figure 10:
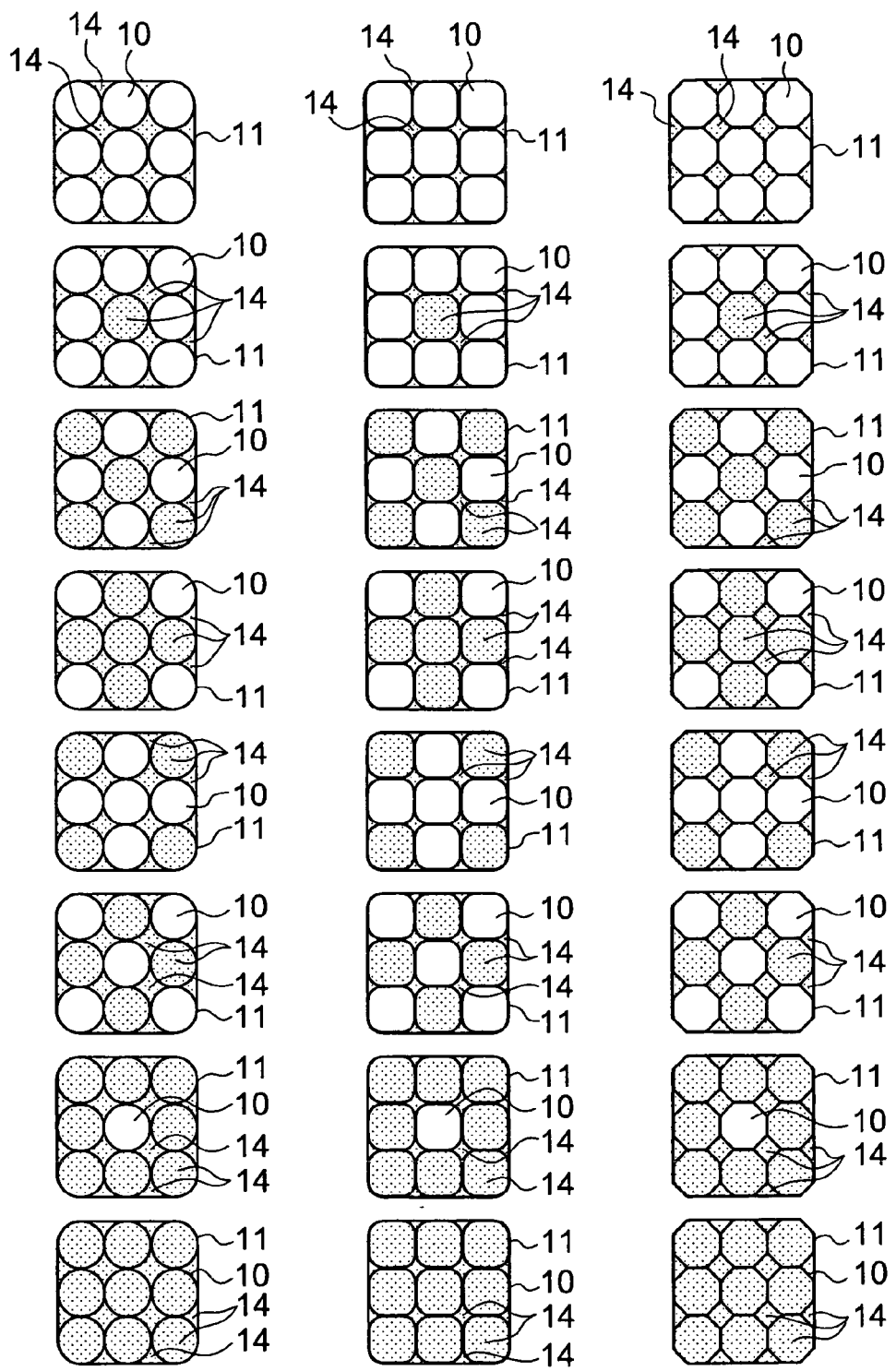
FIG. 10 is a drawing showing various examples of the energy absorbers of the embodiment of the present invention, in which a foaming material is inserted into hollow tubes of fiber reinforced composite material having the same circular section, square section, and octagonal section which are bundled and arranged by an outer layer made of fiber reinforced composite material.

Furthermore, as shown in FIG. 10, the hollow tubes of fiber reinforced composite material 10 and the foaming material 14 may have the same sectional shape of circle, square, or octagon and may be bundled and arranged by the outer layer made of fiber reinforced composite material 11. In this case, it is also preferable that the foaming material is inserted into the hollow tubes of fiber reinforced composite material 10 and has the same sectional shape as that of the hollow tubes of fiber reinforced composite material 10.

In the energy absorbers 1 of the present embodiment, the hollow tubes of fiber reinforced composite material 10 are composed of fibers and hollow tubes of fiber reinforced composite material of resin, and as fibers, fibers of glass, carbon, alamide, metal, or boron and conjugate fibers are selectively used, and as resin, thermoset resin and thermoplastics are selectively used. For the foaming material 14, various materials such as polyethylene series, polyurethane series, polystyrene series, epoxy resin series, phenolic resin series, and polymethacrylic imide series are selectively used.

To make the initial load peak suppression effects by the energy absorbers 1 of the present embodiment clear, the load-displacement characteristic test is carried out on an energy absorber of the conventional example and energy absorbers of Embodiments 1 and 2.

Figure 11:
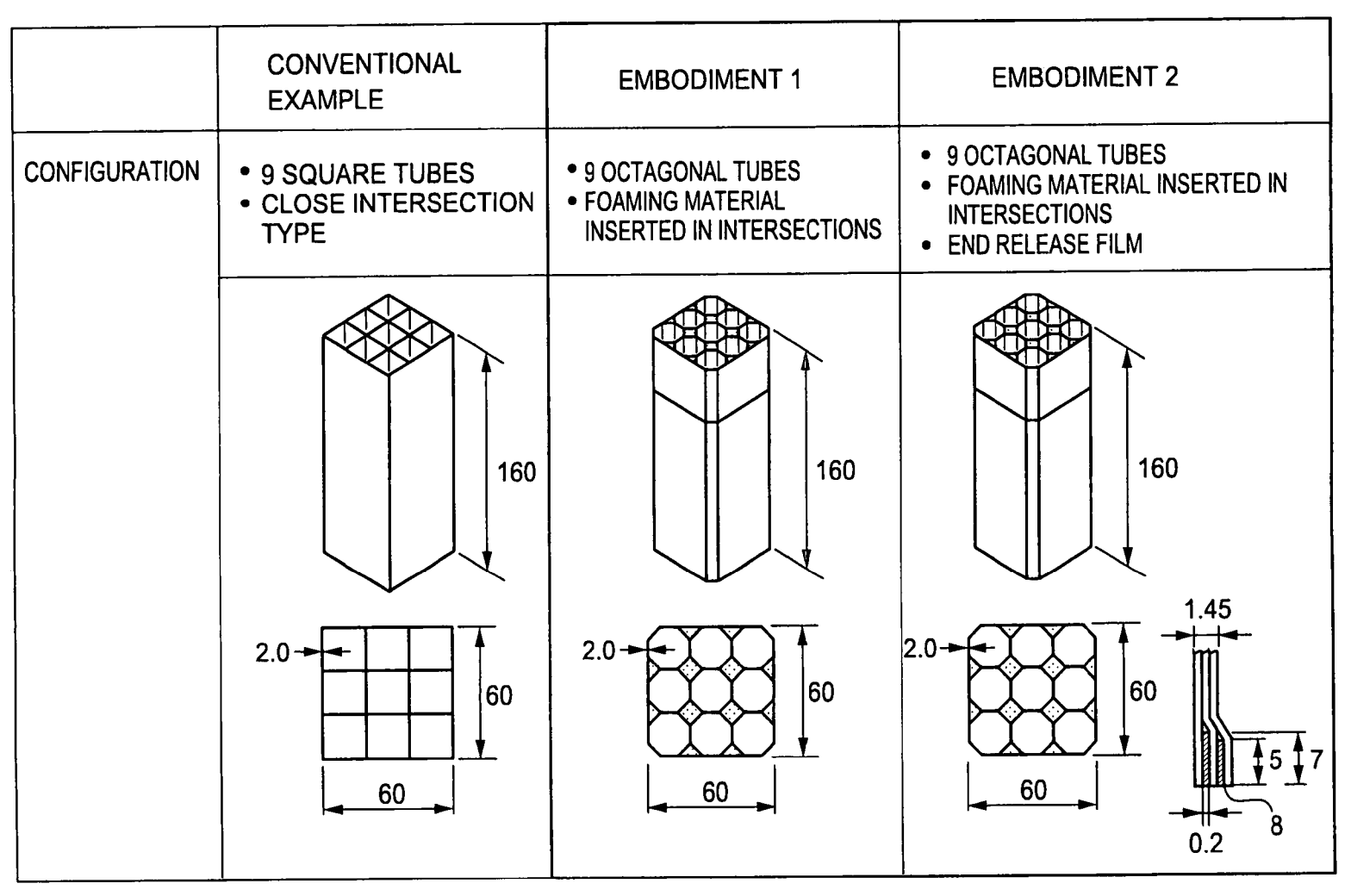
Figure 12:
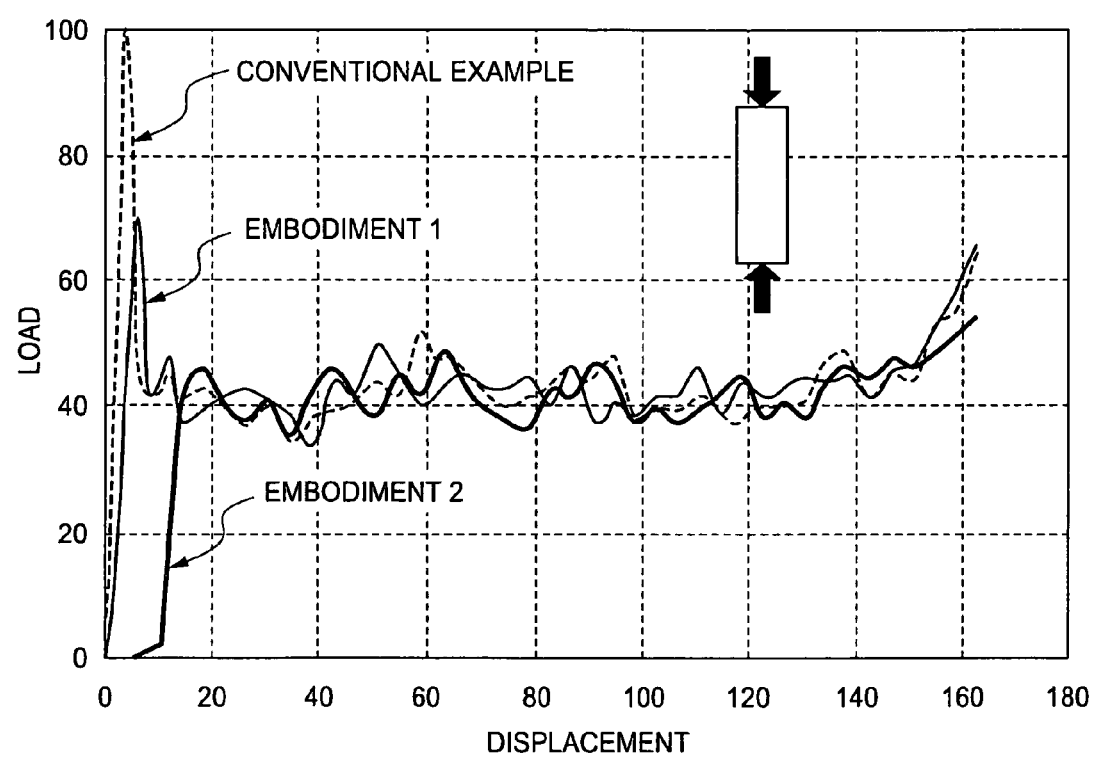
FIG. 12 is a graph showing the results of the load-displacement characteristic test of the energy absorbers of the conventional example and Embodiments 1 and 2 shown in FIG. 11.

The configuration of the energy absorbers of the conventional example and the configurations of the energy absorbers of Embodiments 1 and 2 are shown in FIG. 11 and the results of the load-displacement characteristic test of the energy absorbers are shown in the graphs in FIG. 12. In the energy absorber of the conventional example, the initial load peak harmful for the impact absorption property is extremely large, while in the energy absorber of Embodiment 1, the initial load peak is extremely suppressed and in the energy absorber of Embodiment 2, the initial load peak is eliminated.

Figure 13:
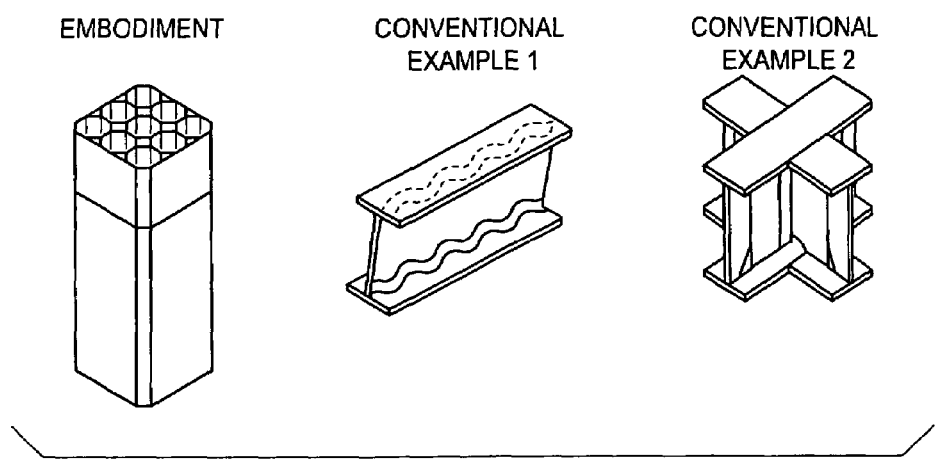
FIG. 13 is a perspective view showing an energy absorber of the embodiment and energy absorbers of conventional Examples 1 and 2 for which the impact energy absorption property is to be measured.
Figure 14:
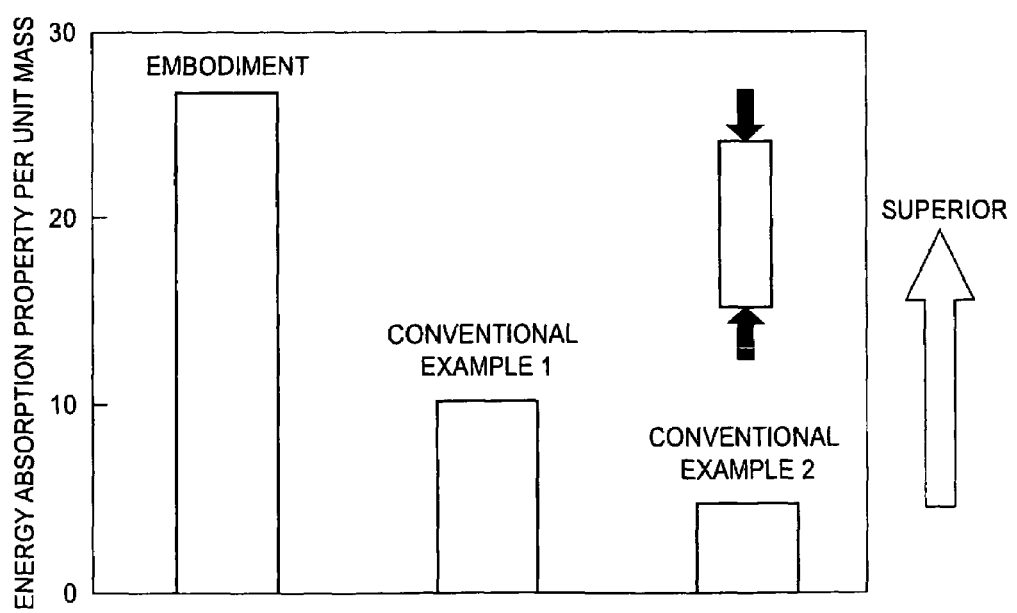
FIG. 14 is a graph showing the measured results of the energy absorption property of the energy absorber of the embodiment and energy absorbers of Conventional Examples 1 and 2 shown in FIG. 13.

Further, to make the initial load peak suppression effects by the energy absorbers 1 of the present embodiment clear, the energy absorption property per unit mass of the energy absorber of the embodiment shown in FIG. 13 and the energy absorber of Conventional Examples 1 and 2 is measured. The graph in FIG. 14 shows that the energy absorber of the embodiment has an extremely high impact energy absorption property compared with the energy absorbers of Conventional Examples 1 and 2.

Furthermore, to make the effects of the energy absorbers of the present embodiment on the effective stroke clear, on a conventional energy absorber, an energy absorber having no sectional space by filling of the foaming material of Embodiment 1, and an energy absorber having a sectional space of Embodiment 2, a load-displacement characteristic test is carried out.

Figure 15:
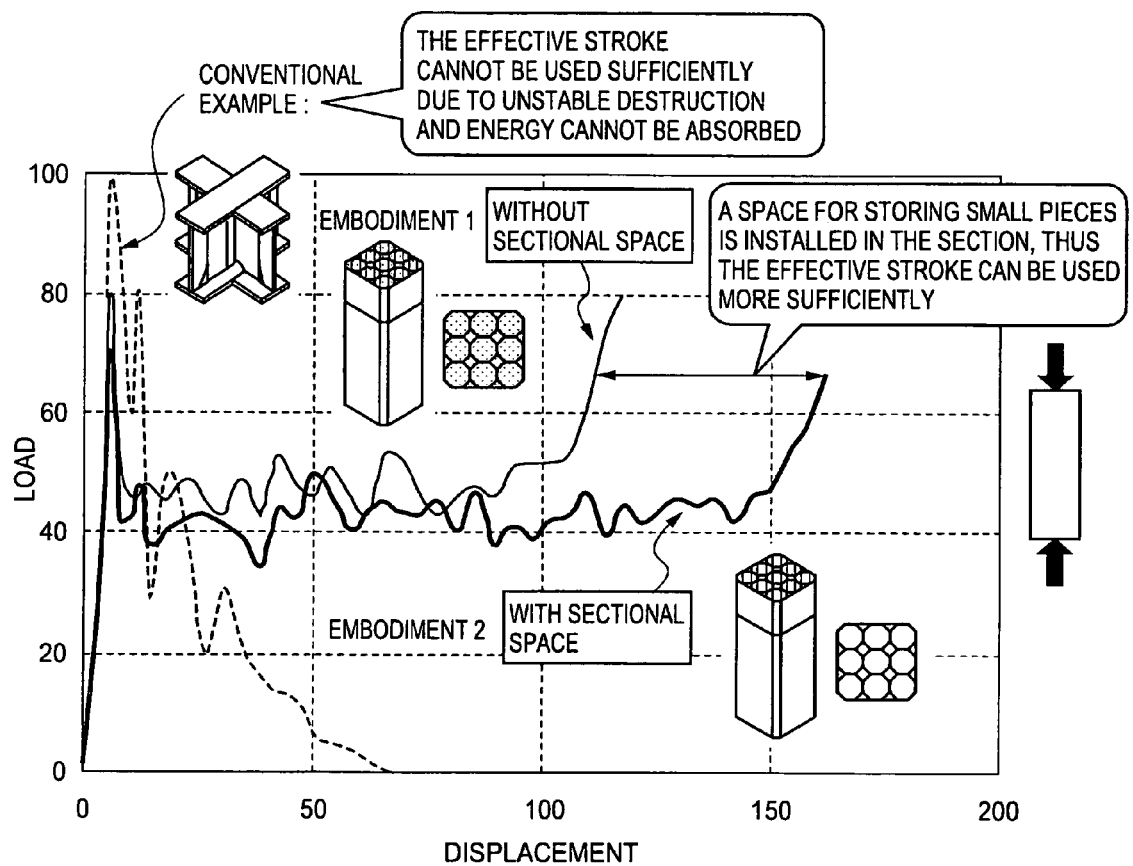
FIG. 15 is a graph showing the existence of the effective stroke by the load-displacement characteristic test of the energy absorbers of the conventional example and the energy absorbers of Embodiments 1 and 2.
Figure 16:
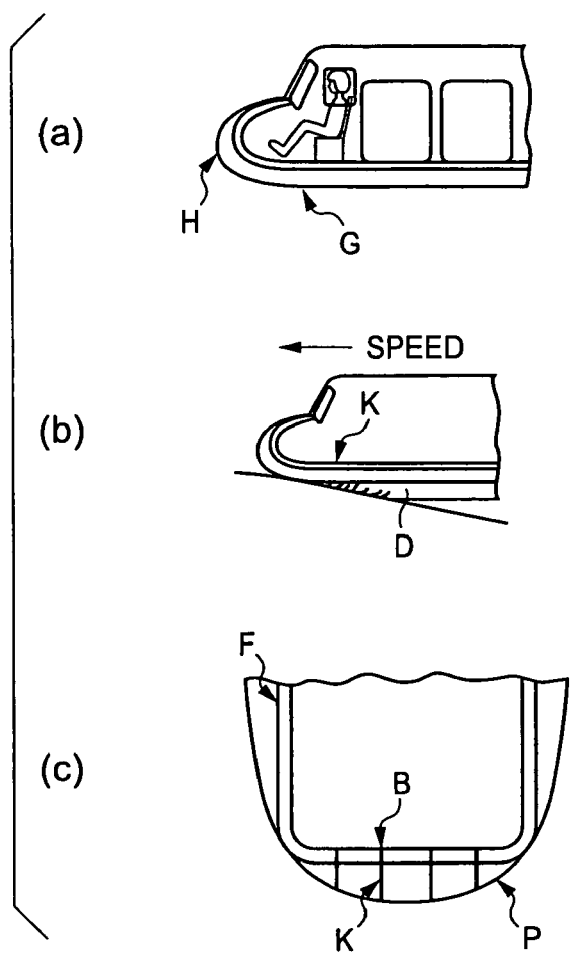
FIG. 16 is a drawing for explaining the basic principle of the impact resistant structure of a helicopter, (a) is a schematic vertical sectional side view of the helicopter on the nose side, (b) is a schematic side view on the nose side at the time of crash situation, and (c) is a schematic vertical sectional view of the fuselage.

The graphs in FIG. 15 show that in the energy absorber of the conventional example, the effective stroke is not used effectively due to unstable destruction, thus energy cannot be absorbed. On the other hand, in the energy absorber of Embodiment 1, destroyed small pieces are cut into the foaming material, thus the member as a whole is prevented from stiffening due to compacting of the destroyed small pieces, and the effective stroke is sufficiently used. Moreover, in the energy absorber of Embodiment 2, destroyed small pieces are stored in the sectional space, thus the member as a whole is prevented from stiffening due to compacting of the destroyed small pieces, and the effective stroke is sufficiently used.

As mentioned above, the impact resistant structure of a helicopter, e.g., a helicopter of which landing gear such as retracted one may not be effectively functioned, of the present invention can produce an excellent effect that the fuselage structure can be provided with impact absorption capacity against the actual crash environment in a shape fitting to the actual helicopter fuselage structure.

Further, the energy absorber of the present invention can suppress the harmful initial load peak for crew member's survivability, improve the absorption property of compression crush energy, and increase the effective stroke, so that they can be applied not only to the impact resistant structure of a helicopter but also to the impact resistant structure for general industrial purpose and can provide a desired impact absorption capacity in a shape fitting to the actual helicopter fuselage structure.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An impact resistant structure of a helicopter, comprising a plurality of energy absorbers, each one of the energy absorbers is formed in a bundled-tube state, positioned under a floor of said helicopter and directly connected to a cabin frame of said helicopter, said energy absorbers being arranged in accordance with a distribution of a ground reaction force on a general ground surface at a time of crash situation so that said energy absorbers are positioned almost directly under a pair of side walls of said frame where impact loads are concentrated at said time of crash situation.

2. The impact resistant structure of a helicopter according to claim 1, further comprising a plurality of curved panels, which take a horizontal load due to a forward crash speed and are crushed in a pantograph shape by a vertical load at the time of crash situation, arranged almost in an longitudinal direction of said helicopter and connected to an sub-floor outer skin or web of said helicopter.

3. The impact resistant structure of a helicopter according to claim 2, further comprising a truss frame connecting said curved panels almost in an X-shape so as to function as a frame member for holding said curved panels during a normal operational use and not to prevent said curved panels from deforming in said pantograph shape at the time of crash situation.

4. The impact resistant structure of a helicopter according to claim 2, wherein a floor beam of said helicopter is arranged on said curved panels, said floor beam being connected to said frame to which said energy absorber is directly connected, thereby a frame-floor beam structure is formed.

5. The impact resistant structure of a helicopter according to claim 4, wherein a cabin structure in a gate shape is positioned above said frame-floor beam structure, said cabin structure being connected to said frame at both side ends of said frame.

6. An energy absorber, comprising a plurality of independent hollow tubes of fiber reinforced composite material integrally formed by bundling only said hollow tubes of fiber reinforced composite material, said hollow tubes of fiber reinforced composite material being arranged so as to reduce a number of intersecting walls of said hollow tubes of fiber reinforced composite material, wherein each of said hollow tubes of fiber reinforced composite material is formed in a plurality of layers in a thickness direction, a film-shaped layer material having lower strength than that of a base material being inserted between end portions of said plurality of layers.

7. The energy absorber according to claim 6, wherein said hollow tubes of fiber reinforced composite material and said outer layer of fiber reinforced composite material are arranged such that a number of intersecting said walls of said hollow tubes or outer layer is less than four surfaces.

8. The energy absorber according to claim 6, wherein said hollow tubes of fiber reinforced composite material are provided with a sectional space for storing destroyed small pieces sequentially generated by progressive crushing.

9. The energy absorber according to claim 6, wherein a sectional shape of each of said hollow tubes of fiber reinforced composite material is circular, elliptic, square, triangular, hexagonal, or octagonal.

10. The energy absorber according to claim 6, wherein said hollow tubes of fiber reinforced composite material are arranged in a row or in plural rows and are bundled circularly, elliptically, rectangularly, or squarely by said outer layer of fiber reinforced composite material.

11. An energy absorber, comprising a plurality of independent hollow tubes of fiber reinforced composite material bundled by an outer layer of fiber reinforced composite material,
wherein said hollow tubes of fiber reinforced composite material and said outer layer of fiber reinforced composite material are arranged so as to reduce a number of intersecting walls of at least one of said hollow tubes of fiber reinforced composite material and said outer layer of fiber reinforced composite material, wherein at least said outer layer of fiber reinforced composite material for bundling said hollow tubes are formed in a plurality of layers in a thickness direction, a film-shaped layer material having lower strength than that of a base material being inserted between end portions of said plurality of layers.

12. The energy absorber according to claim 11, wherein said hollow tubes of fiber reinforced composite material and said outer layer of fiber reinforced composite material for bundling said hollow tubes are integrally formed.

13. The energy absorber according to claim 11, wherein a foaming material is inserted into a space properly selected from space between said hollow tubes of fiber reinforced composite material, space between said hollow tubes of fiber reinforced composite material and said outer layer of fiber reinforced composite material, and insides of said hollow tubes of fiber reinforced composite material.

14. The energy absorber according to claim 13, wherein said hollow tubes of fiber reinforced composite material, said foaming material, and said
outer layer of fiber reinforced composite material are integrally formed.

* * * * *